April 5, 1955 — W. L. MORRISON — 2,705,678
METHOD FOR THE CHILLING AND REFRIGERATION OF PERISHABLE PRODUCTS
Filed Jan. 4, 1954 — 4 Sheets-Sheet 1
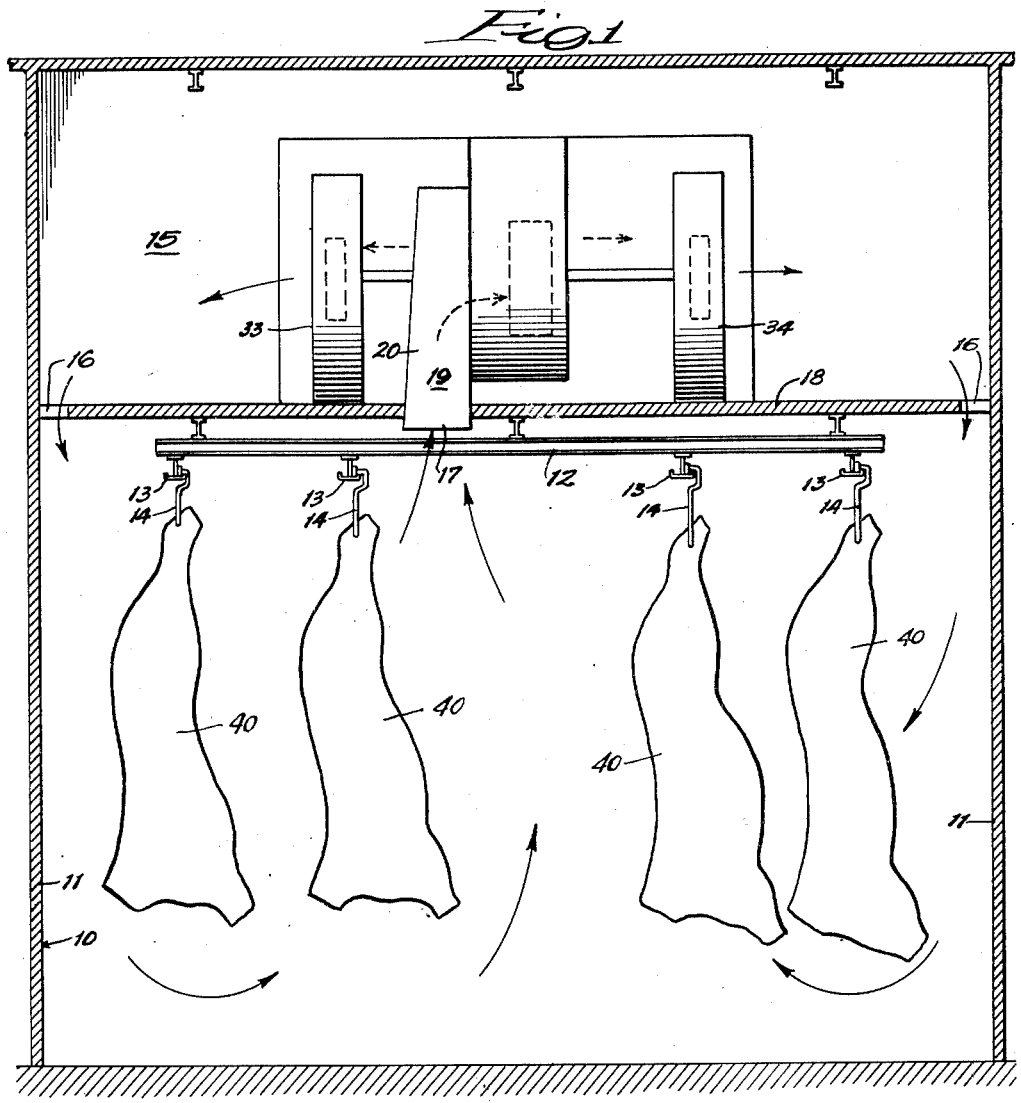
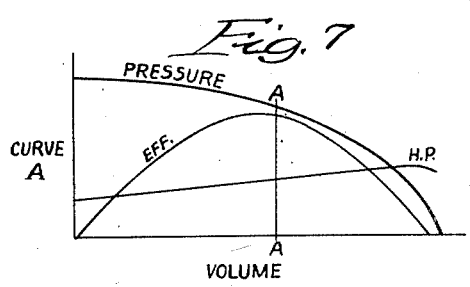
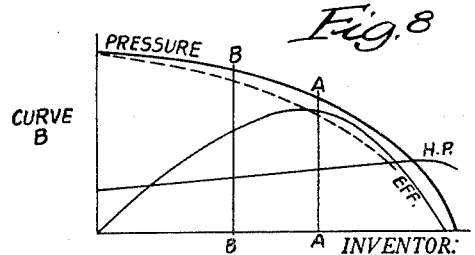
INVENTOR:
Willard L. Morrison,
BY
Ottus, McDougall, Williams & Hersh,
ATTORNEYS.

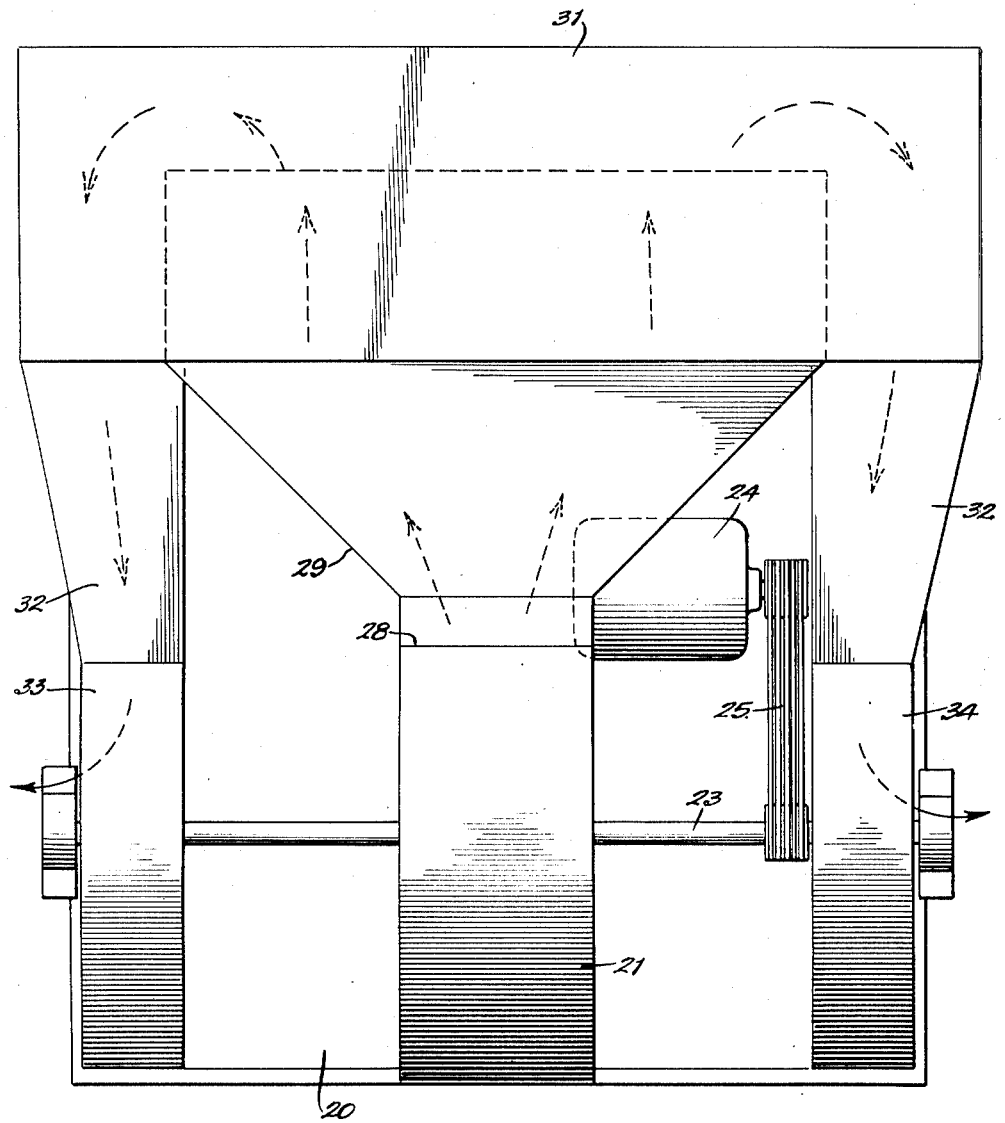

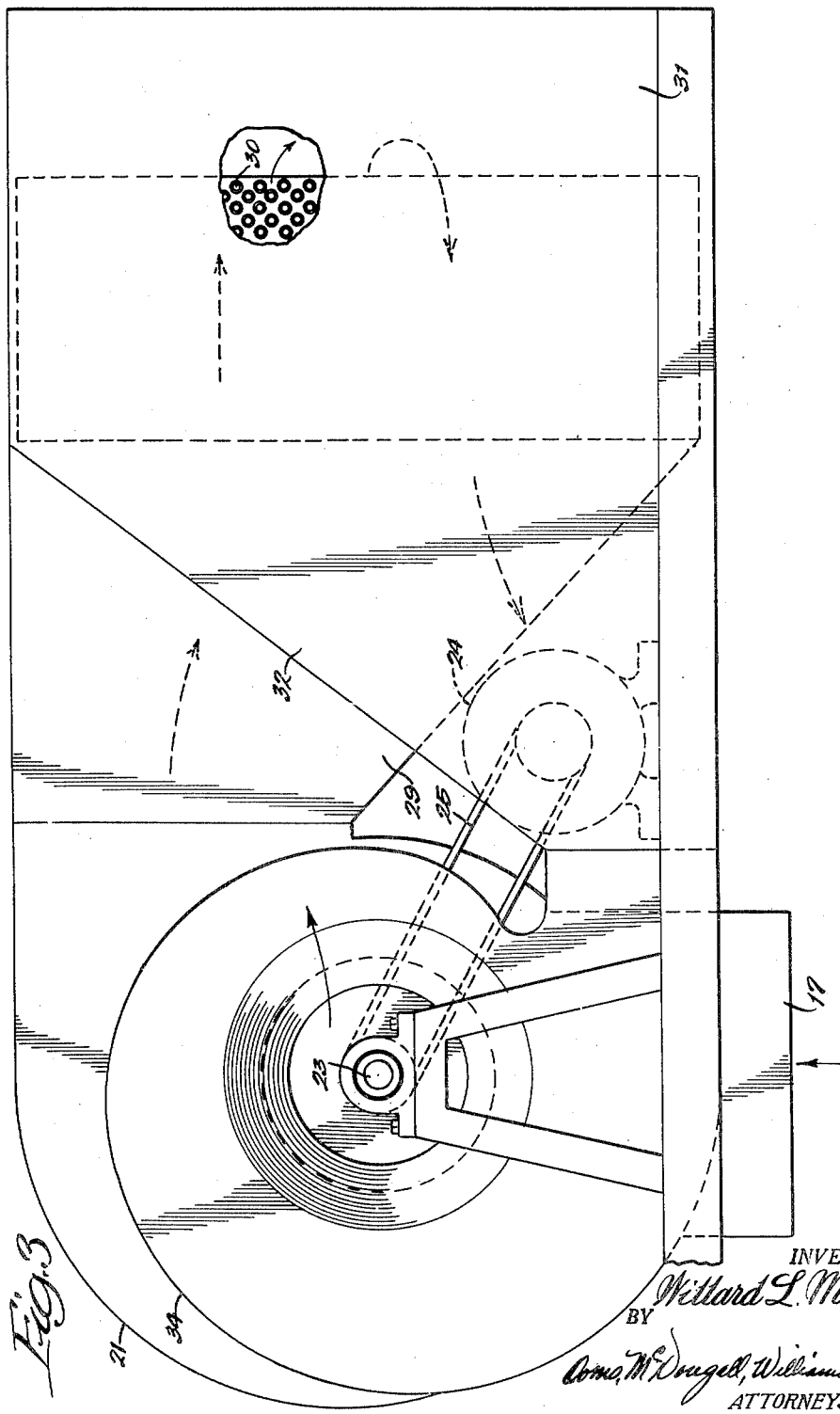

April 5, 1955
W. L. MORRISON
2,705,678
METHOD FOR THE CHILLING AND REFRIGERATION
OF PERISHABLE PRODUCTS
Filed Jan. 4, 1954
4 Sheets-Sheet 4
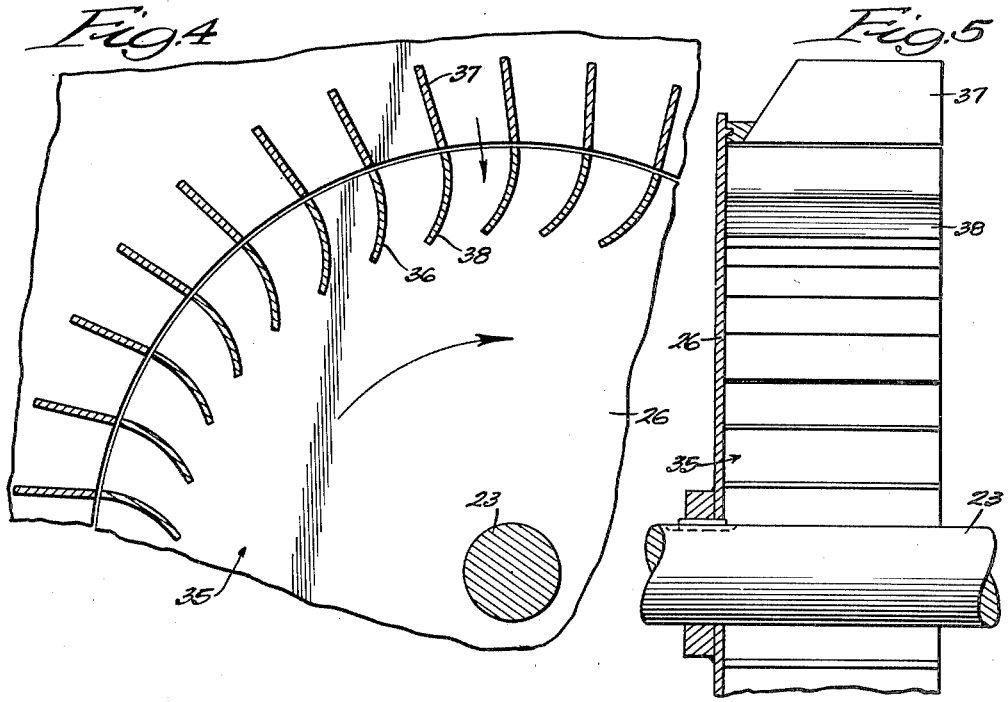
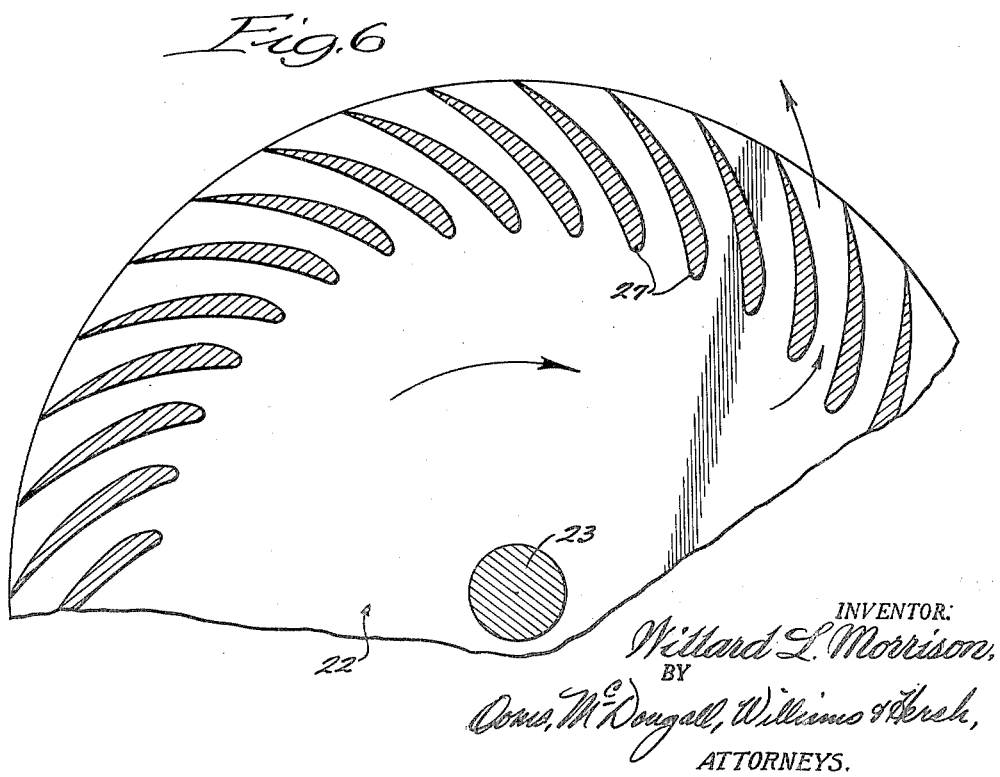
INVENTOR:
Willard L. Morrison,
BY
Coms, McDougall, Williams & Hersh,
ATTORNEYS.

United States Patent Office 2,705,678
Patented Apr. 5, 1955

2,705,678

METHOD FOR THE CHILLING AND REFRIGERATION OF PERISHABLE PRODUCTS

Willard L. Morrison, Lake Forest, Ill., assignor to Union Stock Yards & Transit Company, Chicago, Ill., a corporation of Illinois Application January 4, 1954, Serial No. 402,071

9 Claims. (Cl. 99—194)

This invention relates broadly to the refrigeration of perishable products such as the products of the floriculture, agriculture and meat packing industries, and it relates more particularly to the chilling of meat while holding the loss of moisture to a minimum to prevent not only loss in weight of the meat product but also to prevent deterioration in the appearance and texture of the refrigerated product.

In present systems for the chilling of meat to safe storage temperature, the sides of the meat from the kill floor are suspended in a refrigerated space which is usually cooled by convection from the cooled walls of tubing through which a refrigerant such as brine is circulated. Even without the introduction of fresh air within the refrigerated space, the loss in weight represented by the evaporation of moisture from the meat amounts to about 2 to 2½ percent during the period for cooling the meat to safe temperature and thereafter weight losses in the range of about ½ percent per day occur. This loss in weight is believed to represent the loss in moisture by desiccation of the meat to the environment in which it is suspended for cooling. This loss in moisture from the meat not only represents a tremendous loss in income from the sale of the meat or other perishable products but moisture evaporation from the meat is undesirable from the standpoint of the quality and the texture of the meat as well as the taste and appearance thereof.

It is an object of this invention to provide a process for chilling meat which provides for a marked reduction in the amount of moisture lost from the meat; which refrigerates the meat and other food products in a rapid and efficient manner not only to increase the amount of meat capable of being refrigerated in a given space per unit time but also to reduce the time for refrigeration and thereby reduce the span of time available for moisture loss during the chilling cycle; which militates against the presence of free moisture on the surfaces of the meat and thereby avoids spoilage and discoloration by sliming or other reactions available in the presence of free moisture; which is adaptable not only to the refrigeration of meat but is capable also of use for the preservation of other food products and products which contain moisture as a necessary ingredient thereof, such as vegetables, flowers, fruits and other food products, and it is a related object to provide apparatus for use in the practice of the process of refrigeration.

These and other objects and advantages of this invention will hereinafter appear and for purposes of illustration, but not of limitation, an embodiment of the invention is shown in the accompanying drawings in which—

Figure 1 is a schematic elevational view of a structure employed in the practice of this invention;

Figure 2 is a side elevational view of the refrigeration device employed in the practice of this invention;

Figure 3 is a front elevational view of the device shown in Figure 2 with parts broken away to show the construction in the interior thereof;

Figures 4 and 5 are sectional views of the blower employed in the practice of this invention;

Figure 6 is a sectional elevational view of the turbine assembly shown in Figure 4; and Figures 7 and 8 are curves illustrating the efficiency in operation under various conditions employed in the practice of this invention.

Briefly described, invention herein resides in a process of refrigeration wherein an enclosed chamber containing the sides of meat or other perishable products to be cooled is maintained at refrigeration temperature by the circulation of air which enters the chamber in a supersaturated condition and which preferably remains in a supersaturated state within the chamber. By the term "supersaturated" is meant the presence of water in vapor form in the air in amounts in excess of that which the air is normally able to retain under the temperature and pressure conditions existing as distinguished from the presence of excess moisture in the air in the form of free water, as in particle or aerosol form but in which the amount of moisture vapor present is no greater than that which can be retained at saturation.

To provide cooled air in supersaturated condition to a refrigerated chamber, the air within the chamber is recirculated and, during recirculation, it is subjected to a compression, cooling and expansion cycle. In the compression stage the air that is withdrawn from the chamber at or near saturated condition is compressed, as by means of a centrifugal fan or other device. The work performed upon the air during compression generates sufficient heat to cause the temperature of the compressed air to be raised by as much as 5–15 degrees over and above the air entering the compression stage, depending upon the amount of compression, so that the air issuing from the compression stage may have 5–15 "degrees of unsaturation," that is the amount of moisture in vapor form in the compressed air would be sufficient to saturate at a temperature 5–15 degrees lower.

The compressed and unsaturated air is advanced from the compression stage to a heat exchange device through which refrigerant is circulated at a temperature to maintain the temperature of the coils preferably slightly above the temperature of the air entering the compression stage from the refrigerated chamber. In the heat exchange device, heat of compression is extracted from the air without cooling the air to a temperature below that at which it enters the compression stage and without exposing the compressed air to any surface colder than the temperature at which it enters the compression stage. As a result, the amount of water vapor retained in the air as it passes through the cooling stage remains substantially equivalent to the amount in the air entering the compression stage but because the air is at higher temperature, the amount of water vapor is slightly less than that for saturation. Under such circumstances, there will be no tendency for any of the water vapor in the air to condense on the surfaces of the cooling coils or otherwise to precipitate or condense from the air in the cooling stage.

From the cooling stage, where the compressed air issuing is for all practical purposes considered to be saturated or within a few degrees of saturation with water vapor, the air is advanced to turbines for expansion to normal pressures while doing work in driving the turbine whereby the air cools upon expansion by an amount depending upon the extent to which the air has been compressed. Under normally preferred and practical conditions wherein compression of from 0.5–3.0 pounds per square inch is possible, the air will cool from about 3–12° F. Upon cooling by expansion while doing work, the water vapor originally present in the air remains in vaporous form in what will hereinafter be described as a metastable state except for such small amounts as may precipitate upon dust particles or other nuclei floating in the air which are present mostly at the beginning of the cooling cycle. Since the amount of moisture vapor present in the air prior to expansion was at or within a few degrees of saturation, the amount of moisture vapor which remains in the air reduced in temperature by 3–12 degrees will be in excess of that capable of being retained in the air under saturated conditions and will be what will hereinafter be referred to as having X degrees of saturation, that is the amount of water in vapor form contained within the air would be sufficient for saturation at a temperature X degrees higher.

By refrigeration with air issuing in a supersaturated state from the expansion turbine for introduction into the refrigerated chamber, evaporation of moisture from the surface of the meat or other perishable material is substantially completely avoided thereby to reduce and, in fact, practically eliminate any loss in weight in the meat product during the chilling and refrigeration cycle. Because of the existence of the air in a supersaturated condition, it is possible for the first time to move the air at high velocity past the meat or other produce to minimize the thickness of the static layer of air insulating the meat or produce and thereby greatly accelerate the rate of heat transfer from the meat without increasing loss in weight by desiccation. In the past, rapid movement of the air past the meat or other produce was undesirable because the rate of desiccation was increased by amounts incapable of compensating for the more rapid rate of cooling. Thus, refrigeration with air supersaturated with moisture in vapor form, as distinguished from the presence of free moisture or unsaturated air, greatly accelerates the rate of heat transfer from the meat product or other perishable material without excessive desiccation markedly to reduce the length of the chilling cycle thereby not only to reduce the time available for loss of weight but also to increase the turn-over for more efficient use of the refrigerated space.

In general, at any given temperature and pressure that is below the boiling point of water, a certain amount of moisture as vapor can be retained to saturate a given weight of air. For example, a pound of air at 31° F. and at normal pressure of 29.921″ Hg will be saturated when it contains 0.003621 pound of water vapor. When the pressure is increased to 31″ Hg, saturated air would contain about 0.003495 pound of water in vapor form. At 40° F. and 29.921″ Hg, a pound of air would be saturated when it contains 0.005212 pound of water vapor and at 31″ Hg, the amount of water vapor for saturation would decrease to 0.005029 pound.

In the conventional cooling systems now in use, wherein refrigerant is circulated through cooling coils to provide cold surfaces for lowering the temperature of the surrounding air, the cooling coils will condense moisture on the surfaces thereof when the moisture vapor in the air within the refrigerated chamber approaches that of saturation and the air within the chamber will have an amount of moisture less than that for saturation so that moisture will be extracted from the meat products during cooling. By way of example, in a cooling chamber having an average temperature of 34° F., the air circulated past the cooling coils will enter at about 36° F. and will leave the cooling coils at about 32° F. for entrance into the refrigerated chamber. Assume for the moment that at the pressure conditions existing within the chamber, the air leaving the cooling chamber at 36° F. is saturated at 29″ Hg and therefore contains about 0.004756 pound of moisture in vapor form per pound of dry air. For reducing the temperature of the 36° F. air to 32° F. for introduction into the refrigerated space, the temperature of the coils will be maintained at about 30° F. or below. At 32° F., the air can support only 0.003908 pound of water vapor per pound of dry air and the differences between 0.004756 and 0.003908 pound of moisture vapor per pound of dry air will be condensed on the cold surfaces supplied by the cooling coils over which the air passes. In addition, the 30° F. temperature existing at the surfaces of the coils will reduce the amount of moisture contained in the air adjacent thereto by a greater degree further to reduce the moisture vapor available in the air introduced into the refrigerated chamber.

As the air at 32° F. and containing less than 0.003908 pound of water vapor per pound of dry air enters the refrigerated chamber and is raised upon mixture with the remainder to the average of about 34° F., the amount of moisture vapor present will be far short of the 0.004237 pound necessary for saturation. As a result, the unsaturated air is capable of taking up moisture which is supplied by and removed from the products being refrigerated. This desiccation of foodstuffs, such as meat, fruits, vegetables and the like, results in a loss of quality, tenderness and freshness, as well as weight.

Others have recognized the advisability of refrigeration under conditions which would minimize desiccation of the meat or other perishable materials but to the best of our knowledge no one before has succeeded in the development of a process wherein supersaturated conditions are provided substantially completely to eliminate or markedly to reduce moisture loss from the meat products during the chilling and refrigeration cycle.

In the Kroger tenderizing process, as represented by the Reiman Patent No. 2,528,079, and the Westinghouse process as represented by the Menges Patents No. 2,492,308 and No. 2,489,918, the meat is maintained for a predetermined period of time at a temperature of about 68–70° F. for aging while the relative humidity is held at about 85–90 percent for purposes of minimizing the amount of evaporation of moisture believed to constitute about 70 percent of the meat product. While the processes described in the above and other related patents make use of high humidity to minimize moisture loss, the above mentioned patents which are representative of recently developed tenderizing processes do not make use of air which exceeds saturation in the refrigerating chamber.

Zarotschenzeff, Patent No. 2,065,358, and others have made use of refrigerated air into which brine or water is introduced into the refrigerated space as a fine spray or aerosol in amounts in excess of that capable of being present in the air as water vapor. All of the laws of nature are opposed to the evaporation of more vapor than that capable of being retained in the air under saturated conditions with the result that the free moisture so introduced is incapable of evaporation to provide an amount of water vapor in the air in excess of that for saturation. In consequence, the particles of free water must remain dispersed in the air as fine particles which provide nuclei for the condensation of any moisture vapor were it even possible for an excess to be present in the air. It is appreciated that the presence of free moisture in particle form will tend to make water available immediately to maintain a saturated or near saturated condition. It will be apparent, however, that free moisture in particle form could exist in air which is in a highly unsaturated condition as well. In any event, the mere availability of free moisture would be incapable of providing any degree of supersaturation.

It will be evident that the mere introduction of free moisture into the air, independent of their particle size, will be incapable of producing air having an amount of moisture vapor in excess of that capable of being retained under the temperature and pressure conditions existing even though the total amount of moisture present may far exceed the amount required for saturation. When air at or near saturation comes in contact with the layer of warmer air adjacent the meat and is heated up, the air at higher temperature suddenly becomes relatively more highly unsaturated so that it becomes able to take up additional amounts of moisture. A contest develops between the free moisture in the air and the moisture in the meat for making up the deficiency of moisture vapor in the air, with a result that desiccation occurs, though possibly to a less extent than in prior processes.

In addition, too much free moisture in the air is objectionable because it becomes possible then for free water to be deposited onto the surfaces of the meat to supply a wet condition which is conducive to discoloration and sliming and possible spoilage of the meat.

In the process forming the subject matter of this invention, when supersaturated air is circulated through the refrigerated space, it is unable for the most part to accept additional moisture from materials within the refrigerated chamber. The concepts of this invention are believed to be capable also of explanation from the theoretical standpoint. When the air is extracted from the refrigerated space for circulation into the compression stage of the cooling device, the increase in pressure generated by the fans in the compression system will be accompanied by a rise in temperature in accordance with the formula $$\frac{P1}{P0}1/n\alpha\frac{-1}{\alpha} = \frac{T1}{T0}$$

where $n$ is the compression efficiency, the ratio of specific heats of the air-water vapor mixture, P0 the initial pressure, P1 the final pressure and T1 and T0 the final and initial absolute temperature.

Under the conditions which are believed to exist in the process during the steady state, when the air enters the compression stage, it is believed to be at a temperature of about 36° F. and at a normal pressure of about 29″

Hg. During compression, the pressure is increased to about 31″ Hg. Since for moist air $$\frac{\alpha-1}{\alpha}$$

will be about 0.286, for 100 percent efficiency the temperature of the compressed air will be $$31/29^{.286} = \frac{T1}{496} \text{ or } T1 = 505° \text{ R. or } 45° \text{ F.}$$

Since no moisture is added to the air during the compression stage, the 9° F. rise in temperature will cause the air leaving the compressor to become less saturated so that it is highly unlikely that any moisture will be removed from the air during the compression cycle.

Calculating by Dalton's law of partial pressures, when $P_{mix} = P_{air} + $ water vapor, at 29″ Hg and 30° F., the pressure of the water vapor at saturation will be 0.218″ Hg and therefore the pressure of the air will be 29–0.218 or 28.782″ Hg. At 31″ Hg, the partial pressure will increase in the ratio of 31/29 and therefore will be 0.232″ Hg for the pressure of the water vapor and 30.786″ Hg for the pressure of the air. The temperature at which saturation is present at 0.232″ Hg is 38.3° F. so that the air mixture heated to 45° F. upon compression will have about 7° of unsaturation.

The saturating pressure at 45° F. is 0.30021″ Hg and the relative humidity of the air issuing from the compression stage will be $$\frac{0.232}{0.30021}$$

or 77.4 percent or will contain 0.004591 pound of water vapor per pound of dry air.

From these theoretical considerations, it will be apparent that a condensation of moisture from the compressed air will be incapable of taking place if no part of the air comes in contact with any surface colder than 38.3° F.

In the cooling stage for extracting heat of compression, the coils are therefore maintained at a temperature at or slightly above 38.3° F. Actually the temperature rise in the compression stage will be greater than 9° because of the inability to achieve 100 percent efficiency but the further rise will be relatively small. Assuming that the cooling coils under the conditions described are maintained at 38.5° F., the air will be cooled to about 39–40° F., depending upon the dimension of the cooling section and the efficiency thereof. At 40° F. and 31″ Hg pressure, the relative humidity will be increased to 93.9 percent and the air will still contain 0.004591 pound of water vapor per pound of dry air. There is little, if any, tendency for water vapor to condense and settle out during the stage of extraction for the heat of compression unless the air entering the compression stage originally contained a substantial amount of supersaturation but this is highly unlikely in the steady state.

In the expansion turbine, the air returns to normal pressure of about 29″ Hg for reintroduction into the refrigerated space. In undergoing this expansion, the temperature of the air drops according to the previous formula $$\frac{T2}{T3} = \frac{P2}{P3} n\left(\frac{\alpha-1}{\alpha}\right)$$

where T2 and P2 are temperature and pressure at the inlet to the turbine and T3 and P3 are temperature and pressure conditions at the outlet. $n$ is the turbine efficiency calculated to be about 0.8 and $\alpha$ is the ratio of specific heats of a water vapor mixture. Applying these conditions to the above formula $$\frac{500}{T3} = 1.069^{0.243} = 492° \text{ R. or } 32° \text{ F.}$$

It has been established that water vapor can be present in amounts for supersaturation when created by an expansion process of the type described. A supersaturated system formed upon expansion of near saturated air exists in what appears to be metastable equilibrium, that is in a state which remains stable in the presence of small or infinitesimal disturbances and in the absence of a major disturbance but is capable of precipitation to form particles of free water on nuclei such as dust particles or electrons introduced by electronic impulse. Such particles of free water will form in small amouts especially at the start of the cooling cycle until the particles of dust within the air system are removed and, while such particles of free moisture may be visible through a microscope, the amount of water vapor that condenses into free water appears to be unimportant with regard to the metastable state of supersaturation.

It will be apparent that the air issuing from the turbine at 32° F. and 29″ Hg will contain the same amount of moisture which was present to saturate the air entering the compression stage at 36° F. and 29″ Hg. As a result, the air leaving the turbine may be considered, for purposes of this invention, to have 4 degrees of supersaturation. The degree of supersaturation that can be developed will depend greatly upon the pressures generated in the compression step which controls the rise in temperature and the amount of heat capable of being extracted before cooling by expansion. For all practical purposes, it will be apparent that with available pressures of from 1–3″ Hg capable of being developed in circulating systems of the type described, the degree of supersaturation developed will be limited to between 2 to 8 or 10 degrees with a preferred operating range of 4 to 6 degrees of supersaturation. Since the temperature rise during circulation of the air at relatively high velocity through the refrigerated space seldom exceeds 4° F., supersaturated conditions will continue to exist so that the refrigerated air passing by the meat will be unable freely to accept moisture from the meat or other products.

In the process described, the coldest point in the system will be found to exist at the turbine discharge. As a result, no surface is available either in the refrigeration device or in the refrigerated chamber that is as cold as the air-water vapor mixture issuing from the turbine in a supersaturated state and condensation on cold surfaces, characteristic of prior processes, is thus substantially completely avoided.

In the copending application Ser. No. 318,906, filed November 5, 1952, now abandoned, description is made of a turbo refrigeration device which may be used in the practice of this invention for recirculating air through a refrigerated space wherein the air issuing from the outlet end contains an amount of moisture in vapor form in excess of that required for saturation at the temperature conditions existing within the chamber. Description will hereinafter be made to another form of apparatus representing a commercial installation for carrying out the process previously discussed.

The refrigeration system illustrated in the drawings represents an installation for refrigeration of a chilling room adapted to contain about 200 sides of beef for cooling the beef from the killing temperature of about 100° F. to about 40° F. for storage and then to maintain the beef at that temperature until removed for shipment to consumer outlets.

In Figure 1, illustration is made schematically of a construction for the refrigeration of sides of beef wherein 10 indicates a refrigerated chamber having insulated walls 11 with channel rails 12 suspended from the ceiling for support of trolleys 13 used to convey sides of beef 40 from the killing floor into the refrigerated chamber and from which they are hung by hooks 14 until chilled to safe temperature for storage or distribution. From the killing floor, the sides of beef enter the refrigerating chamber at a temperature of about 100° F. The refrigerated room itself may rise to about 40° F. as the recirculation of refrigerated air is stopped during the processes of loading and unloading the chamber.

The refrigerating means is located in a separate chamber 15 above the first and is in communication therewith through openings 16 in the floor adjacent the side walls 11 in alignment with the outlets from which the air issues at high velocity from the refrigerating means and through an opening 17 in the ceiling 18 of the refrigerated room which communicates with the intake 19 leading to a centrifugal fan within the refrigeration device.

The refrigeration device, illustrated in greater detail in Figure 2 of the drawings, comprises a housing 20 having an inlet chamber in communication with the opening 17 which connects the upper chamber with the refrigerated space. In communication with the inlet plenum chamber 20 and located axially thereof is a fan chamber 21 containing a multiple bladed impeller fan 22 mounted on an intermediate portion of a drive shaft 23. A driving motor 24 is operatively connected by belts 25 to the shaft 23 for rotational movement thereof at the desired speed.

The fan itself is of the multiple bladed impeller type having the inlet in the form of a throat 26 at the center with the blades 27 curving at a backward angle radially for radial displacement of air from the periphery of the wheel outwardly into the housing under compression equivalent to about 1–3 pounds per square inch. The heat of compression increases the temperature of the air as previously described but it will be understood that the pressure developed and the heat of compression may be varied depending upon the size and type and speed of the fan and the restrictions employed for varying and controlling air flow.

In connection with the outlet 28 of the fan chamber is an outlet plenum chamber 29 formed of sheet metal or the like which increases in dimension from the inlet of the fan housing to a bank of cooling coils 30 through which refrigerant is circulated for extracting heat of compression from the air as it passes therethrough still under compression. For most efficient heat transfer to cool the air uniformly during passage between cooling coils, it is preferred to introduce the refrigerant fluids for flow from the end portion from which the air leaves the cooling area toward the end portion at which it enters to provide for counter-current flow with the coils for gradual and uniform reduction of temperature of the air which engages the coils at lowest temperature upon leaving the cooling area. The velocity of the air as it passes over the cooling coils or other cooling means is relatively unimportant because the temperature of the coils is maintained slightly above the temperature of the air before compression, as previously described, so that the air passing over the coils will be less saturated than the incoming air and will engage no surface capable of causing supersaturation for encouraging condensation.

The bank of cooling coils 30 spans the entrance opening into an air chamber 31 dimensioned to extend beyond the cooling coils and also beyond the ends thereof for dividing the stream of air under compression and for directing separate streams from opposite ends forwardly through chambers 32 to the inlet openings in turbine housings 33 and 34 positioned on opposite sides of the inlet plenum and fan chamber and in axial alignment therewith.

As illustrated in Figures 4 and 5, each housing 33 and 34 contains a multi-bladed turbine 35 mounted for rotational movement on the same shaft 23 upon which the fan is mounted for rotational movement in the same direction and at the same speed. The turbine blades 36 are radially arranged in equally spaced apart relation about the peripheral portion of the wheel with the entrance end portion 37 at the periphery of the wheel having angles slightly in advance of the radial while the curvilinear portion 38 at the inner ends of the blades is turned opposite the direction of rotation of the wheel for delivery of air therefrom with a minimum amount of centrifugal force or power remaining therein, as will hereinafter appear.

The turbine blades rotate within a turbine housing having stationary guide plates conforming to the lateral contour of the blades for defining the path of movement of the compressed air upon expansion while doing work and driving the turbine during passage from the periphery, through the bladed portion to the throat of the wheel. The work provided by the air during expansion is utilized as power transmitted directly along shaft 23 for driving the fan compressor with additional power added as necessary by the driving motor 24. The expanded and refrigerated air containing moisture vapor in excess of that for saturation issues axially from the throat of each of the turbine housings and is directed against the opposite side walls 11 for circulation by gravitational flow through the openings 16 to the cooling chamber below.

The following comprises a set of data taken from the operation of a device of the type described for chilling sides of beef delivered from the killing floor for reduction to safe temperature for storage or shipment. From the killing floor, the sides of beef will have a temperature of about 100° F. but the temperature will rise for a short time after kill to about 102–103° F. perhaps as a result of enzymatic action or the like which initially takes place. For storage, it is desired to reduce the temperature of the meat to below 50° F. and ultimately to about 34–38° F.

| Time | Room T | Air In | Air to Coil | Air from Coil | Coil | Air Out | Surface | Round |
|---|---|---|---|---|---|---|---|---|
| 0 | 42 | 42 | 55 | 43.6 | 42 | 37 | 86 | 100 |
| 1 | 36 | 38.5 | 51 | 40.1 | 38.5 | 33.5 | 75.5 | 103 |
| 2 | 35 | 37.5 | 50 | 39.1 | 37.5 | 32.5 | 67 | 101 |
| 3 | 33.5 | 36 | 48 | 37.6 | 36 | 31 | 61.5 | 96.5 |
| 4 | 32 | 34.5 | 46 | 36.1 | 34.5 | 29.5 | 54 | 93.5 |
| 5 | 32 | 34.5 | 46 | 36.1 | 34.5 | 29.5 | 51.5 | 90.5 |
| 6 | 31.2 | 33.7 | 45 | 35.3 | 33.7 | 28.7 | 48 | 86 |
| 7 | 31.0 | 33.5 | 44.8 | 35.1 | 33.5 | 28.5 | 46 | 83.5 |
| 8 | 31.0 | 33.5 | 44.8 | 35.1 | 33.5 | 28.5 | 43 | 80 |
| 9 | 31.0 | 33.5 | 44.8 | 35.1 | 33.5 | 28.5 | 40.5 | 75.5 |
| 10 | 31.0 | 33.5 | 44.8 | 35.1 | 33.5 | 28.5 | 38.8 | 73 |
| 11 | 31.0 | 33.5 | 44.8 | 35.1 | 33.5 | 28.5 | 38 | 70 |
| 12 | 31.0 | 33.5 | 44.8 | 35.1 | 33.5 | 28.5 | 37 | 68 |
| 13 | 31.0 | 33.5 | 44.8 | 35.1 | 33.5 | 28.5 | 35.5 | 65.5 |
| 14 | 31.0 | 33.5 | 44.8 | 35.1 | 33.5 | 28.5 | 34.9 | 63 |
| 15 | 31.0 | 33.5 | 44.8 | 35.1 | 33.5 | 28.5 | 34 | 62 |
| 16 | 31.0 | 33.5 | 44.8 | 35.1 | 33.5 | 28.5 | 33.5 | 60 |
| 17 | 31.0 | 33.5 | 44.8 | 35.1 | 33.5 | 28.5 | 33 | 58 |
| 18 | 31.0 | 33.5 | 44.8 | 35.1 | 33.5 | 28.5 | 32 | 57 |
| 19 | 31.0 | 33.5 | 44.8 | 35.1 | 33.5 | 28.5 | 31.8 | 56 |
| 20 | 31.0 | 33.5 | 44.8 | 35.1 | 33.5 | 28.5 | 31.3 | 54.5 |
| 21 | 31.0 | 33.5 | 44.8 | 35.1 | 33.5 | 28.5 | 31.2 | 53.2 |
| 22 | 31.0 | 33.5 | 44.8 | 35.1 | 33.5 | 28.5 | 31.2 | 51.5 |
| 23 | 31.0 | 33.5 | 44.8 | 35.1 | 33.5 | 28.5 | 31.1 | 49.5 |
| 24 | 31.0 | 33.5 | 44.8 | 35.1 | 33.5 | 28.5 | 31.1 | 48 |

The column headed "Time" refers to elapsed time in hours starting with the initiation of the refrigeration device for cooling after the sides of beef have been placed in the refrigerated chamber. Operation was commenced as soon as the room was loaded with the beef for chilling.

"Room T" relates to the average temperature of the refrigerated room in degrees Fahrenheit. It will be understood that the temperature may vary from 2° or more at the entrance and adjacent the opening in the floor in alignment with the outlet from the turbine housing to 2° or less at the opening at the ceiling of the refrigerated room leading to the inlet of the refrigerating device.

"Air In" relates to the temperature of the air entering the plenum chamber leading to the compressor fan for circulating air under pressure through the refrigerating coils to the expansion turbine.

"Air to Coil" indicates the temperature of the air entering the cooling coils for heat transfer after the air temperature has been raised by heat of compression in the fan housing.

"Air from Coil" indicates the temperature to which the air has been cooled by extraction of some of the heat of compression upon passage through the cooling space.

"Air Out" relates to the temperature of the air issuing from the expansion turbine for delivery to the refrigerated space for chilling the meat.

"Coil" indicates the temperature of the surface of the coil for extraction of heat of compression from the air during passage from the compression fan to the expansion turbine.

"Surface" and "Round" indicate the temperature of the meat in the refrigerated room as measured at the surface of the side of beef and in the interior of the round.

It will be apparent from the description and from the data taken of actual operation that the chilling cycle may be divided into two phases hereinafter referred to as the initial or unsteady state and the steady state. During the unsteady state, conditions are continually changing with respect to the temperatures of the air in the various stages of the process and in the temperature of the refrigerant circulated through the cooling coils until the room is cooled down to the desired temperature and then the steady state commences.

The refrigerated chamber will seldom rise above 40–45° F. while the refrigeration device is inactivated and the room opened for unloading and for loading with the sides of beef or other perishable materials. Usually the amount of moisture in the air of the refrigerated chamber will be sufficient to provide supersaturation under the conditions existing in the steady state. In the event that the humidity should be too low, moisture in the necessary amounts or even more may be introduced at the very start as by means of a spray or else the small amount of moisture necessary for saturation of the air entering the compression stage may be derived in part from the shrouds applied to the sides of beef or from moisture sources provided within the chamber, but it is preferred to introduce the additional moisture from some outside sources.

During the initial state, the refrigerant circulated through the cooling coils is varied as required to keep the temperature of the coils the desired degree above the inlet temperature of the air to the compression fan to avoid condensation, as previously described. For such purpose, use may be made of conventional blending devices controlled by thermocouples for metering the necessary amounts of cold refrigerant at about 0° C. with the refrigerant being recirculated from the cooling coils to provide the desired temperature in the refrigerant for circulation.

In the event that the amount of supersaturation in the room is such that the air entering the compression fan still contains a substantial degree of supersaturation, condensation of moisture may take place in very limited amounts in the cooling coils to remove moisture in excess of that for saturation of the air being advanced to the expansion turbine. Such extraction of moisture will correspond in amounts to leave an amount of moisture in the air for the desired degree of supersaturation upon expansion. Once the steady state is reached, the conditions are such that no further changes are required and condensation no longer takes place in the cooling coils, as previously described in the theoretical discussion, thereby to maintain a desired degree of supersaturation in the refrigerated air introduced into the chamber.

It will be apparent that the initial or unsteady state may require only about six hours but that the meat which is low in heat transfer will not yet be cooled internally to safe temperature so that it may be necessary to continue with the operation of the device in the steady state for an additional 18 hours or more until the beef is reduced in temperature throughout.

It has been found that in a refrigeration cycle of the type embodying features of this invention for the reduction of sides of beef from the temperature existing as they are removed from the kill floor to a safe storage temperature of less than 40°, the loss in weight which has been secured due possibly to extraction or evaporation of moisture from the meat amounts to less than 1½ percent by weight as compared to about 2½ percent by weight or more by previous methods of chilling. It has further been found that the loss in weight during further storage of the meat may amount to about ¼ of 1 percent or less per week as compared to better than ½ of 1 percent per day by previous methods at least for the first few days. With such facts, it is calculated that a savings of over $600,000 per year per unit of the type and capacity described can be effected after deducting whatever additional cost may be required for equipment or power in operation.

In the described refrigeration machine, the required amount of refrigeration is greater than that for present systems. The total refrigeration is governed by the temperature drop through the coils and the amount of air and water vapor handled. If W is the weight of air-water vapor mixture handled per unit time, the total refrigeration required and the input of the compressor will be proportional to $W(T1-T2)$ and the net refrigeration and the output of the turbine is proportional to $W(T0-T3)$ in which $T1-T0$ is the temperature rise in the compressor and $T2-T3$ is the temperature drop in the turbine. The total amount of refrigeration and net refrigeration is equal to the difference between the input to the compressor and the output of the turbine.

| Compressor input | Turbine output | Total refrig. | Net refrig. |
|---|---|---|---|

$$W(T1-T0) - W(T2-T3) = W(T1-T2) - W(T0-T3)$$

The net horsepower required by the refrigeration machine may also be expressed by the difference between compressor input and turbine output. This net horsepower is the amount that is supplied to the machine by an external power source such as the driving motor 24. While the refrigeration device may be operated at various speeds to provide a wide range of conditions, speed control is not in itself a sufficiently satisfactory method of control. The amount of air-water vapor mixture which is handled will vary proportionally with the speed of operation of the refrigeration device. However, the pressure developed by the compressor will vary as the square of the speed. In other words, if the refrigeration device were operated at ½ speed, the pressure rise in the compressor would be ¼ of that originally obtained. Thus, by reducing the speed, the degree of supersaturation in the air-water vapor mixture may be reduced.

In practice, it is desirable to maintain as high a degree of supersaturation as is practically possible in order to insure the presence of sufficient moisture vapor in the air to resist desiccation of the perishable product within the chamber. The degree of supersaturation is found to be dependent greatly upon the temperature drop through the turbine. Since the turbine inlet pressure is essentially equal to the compressor outlet pressure, it has been found more expedient to be able to vary the weight flow of air-water vapor mixture through the machine without changing the compressor ratio developed by the machine.

It has been found that a constant degree of supersaturation within the practical range of from 2 to 10 degrees may be maintained by reduction in refrigeration loads by providing a constant pressure ratio in the compressor and by reducing the weight flow of air-water vapor mixture through the refrigeration device by the use of controllable spin vanes at the inlet to the compressor fan. The constant degree of supersaturation desired may be achieved further by a combination of the inlet spin vanes and by speed control and thereby to provide a degree of supersaturation calculated to be most desirable for the particular product with minimum expenditure of power and refrigeration.

A typical compressor performance may be illustrated by curve A. Generally the compressor is selected to operate at or near its peak efficiency points A—A. Operation at reduced loads to the left of A—A are possible but it will be seen that the efficiency falls off rapidly. By the use of adjustable inlet vanes, it is possible to operate at reduced loads without appreciable loss of efficiency as illustrated in curve B.

The solid lines represent the performance with the vanes wide open and correspond to that of a compressor without inlet vanes. The broken lines are for the same compressor with the vanes partially closed and with the compressor operating at the same speed. As will be seen from the curves, the peak efficiency shifts from A to B in response to closing of the vanes and the pressure developed drops slightly.

The function of the inlet spin vanes for providing maximum efficiency in operation and control of the degree of supersaturation to a constant level will be clarified by further development in the copending application wherein the refrigeration device described herein will be described and claimed in greater detail.

In the event that it should be desired to achieve a higher degree of supersaturation, it can be achieved by the development of higher pressure from the compressor. It is also possible to speed up the compressor to obtain higher pressures and close the vanes to reduce the flow to the original or a lesser amount. When the compressor is speeded up, the pressure will rise as the square of the speed and the volume directly as the speed and the horsepower as the cube of the speed. By the use of inlet spin vane control and by speed control, it is possible to increase the pressure to achieve a desired degree of supersaturation while closing the vanes to maintain constant volume. In so doing, the horsepower rises only as the square of the speed instead of as the cube thereby to provide for more efficient operation and for desired control of supersaturation.

As previously described, the degree of supersaturation required for chilling of the meat in a desired manner without excessive desiccation may be achieved by the control of pressures and air flow by an amount to provide for 2 to 10 degrees of supersaturation. Greater amounts of supersaturation are difficult to achieve by practical means and also tend to provide a less stable condition to encourage precipitation of moisture vapor into free moisture whereby supersaturated conditions can be entirely eliminated and wet conditions provided which are deleterious to the product being cooled.

It will be understood that conditions may exist wherein it is desirable to effect desiccation of the meat for a short period of time during the initial stage of the chilling cycle to condition the meat. Under such circumstances controlled unsaturated conditions may be caused to exist by proper control of the temperature, moisture and operating conditions of the refrigeration device. By proper control it is possible to maintain a desired degree of unsaturation and conversion to supersaturated conditions described substantially immediately in response to demand upon completion of the purposes for desiccation thereby to maintain controlled conditions for refrigerating the meat.

It will be apparent also that in the event that circulation through the refrigerated space is of such character as to provide for a temperature drop less than 2–4° F., such for example as 1° F., then it will be sufficient for purposes of maintaining the desired supersaturated condition to introduce refrigerated air having 1 degree or more supersaturation. It will also be evident that the conditions for cooling will vary for different materials but the desirability for a supersaturated atmosphere will remain the same throughout the greater proportion of the chilling cycle and preferably throughout the refrigeration cycle. For example, with beef and other meats, it is preferred to chill to a temperature below 40° F. and preferably to within an area of 32.5–38° F. and thus it is desirable to maintain conditions for introducing supersaturated air within a temperature range of 21–38° F. with at least ½° and preferably between 2–10° of supersaturation. With vegetables, flowers, or fish, the temperature will vary.

It will be further understood that the development of supersaturated conditions in accordance with the concepts of this invention does not depend on the freedom of condensation of water in the cooling stage since it is possible that some amounts of water will be condensed on the cooling coils when a relatively high degree of relative humidity exists within the chamber at the start of the refrigeration cycle. The tendency, however, is to avoid condensation at any point within the refrigeration device.

It will be understood that changes may be made in the details of construction, arrangement and operation without departing from the spirit of the invention, especially as defined in the following claims.

I claim:

1. In the method of chilling and refrigerating meat comprising the steps of positioning the meat to be chilled and refrigerated in an enclosed space, passing refrigerated supersaturated air by the meat to extract heat therefrom with minimum extraction of moisture, withdrawing air from the enclosed space while in a state of near saturation with moisture vapor, compressing the air extracted to about ½ to 3 pounds per square inch whereby the air is raised by the heat of compression to a temperature above that at which the air would be saturated by the amount of moisture contained therein upon withdrawal from the enclosed space, extracting heat of compression from the compressed air by passing the air in heat exchange relation with a cooling surface having a temperature slightly above that of the temperature of the air withdrawn from the enclosed space, expanding the compressed and cooled air to about the pressure existing within the enclosed space while doing work whereby the air is reduced to a temperature below that at which the air would be saturated with the amount of moisture contained therein upon withdrawal from the enclosed space, and introducing the cold supersaturated air directly into the enclosed space and in which the supersaturated air introduced into the enclosed space is supersaturated with water in vapor form in excess of that which the air is normally able to retain under the temperature and pressure conditions existing as distinguished from excess moisture in the air as free water in particle or aerosol form.

2. In the method of chilling and refrigerating meat comprising the steps of positioning the meat to be chilled and refrigerated in an enclosed space, withdrawing the air from the enclosed space while in a state of near saturation with moisture vapor, compressing the air as it is extracted to a pressure of about ½ to 3 pounds per square inch whereby the air is raised by the heat of compression to a temperature above that at which the air would be saturated by the amount of moisture contained therein upon withdrawal from the enclosed space, passing the compressed air in heat exchange relation with a surface having a temperature slightly above that of the temperature of the air withdrawn from the enclosed space whereby heat of compression is extracted from the air without reducing the air to a temperature below that at which the air would be saturated by the amount of moisture contained therein upon withdrawal from the enclosed space expanding the air to about the pressure existing in the enclosed space while doing work whereby the air is reduced to a temperature of about ½ to 10° F. below that at which the air would be saturated with the amount of moisture contained therein upon withdrawal from the enclosed space, and introducing into the enclosed space the expanded air supersaturated with water in vapor form in excess of that which the air is normally able to retain under the temperature and pressure conditions existing as distinguished from excess moisture in the air as free water in particle or aerosol form.

3. In the method of chilling and refrigerating perishable products comprising the steps of positioning the products within an enclosed space, withdrawing air from within said enclosed space, compressing the air withdrawn from the enclosed space whereby the air is raised in temperature by the heat of compression, extracting heat of compression from the air to reduce the temperature of the air to a level slightly above the temperature of the air withdrawn from the enclosed space, expanding the compressed air down to the pressure conditions existing within the enclosed space while doing work whereby the air is reduced in temperature below that of the air withdrawn from the enclosed space while retaining an equivalent amount of moisture whereby the air is supersaturated with moisture vapor in excess of that which the air is normally able to retain under the temperature and pressure conditions existing as distinguished from excess moisture in the air as free water in particle or aerosol form.

4. In the method of chilling and refrigerating perishable products with controlled desiccation comprising the steps of positioning the perishable products within an enclosed space, introducing refrigerated supersaturated air into said space in which the air is supersaturated with water in vapor form in excess of that which the air is normally able to retain under the temperature and pressure conditions existing as distinguished from excess moisture in the air as free water in particle or aerosol form.

5. The method as claimed in claim 4 which includes the step of passing the supersaturated air at relatively high velocity by the perishable products to effect rapid heat transfer from the perishable products without extraction of excess moisture.

6. The method as claimed in claim 4 in which the air introduced into the enclosed space is characterized by having from 2–10 degrees of supersaturation.

7. The method for chilling perishable products as claimed in claim 4 which includes withdrawing an amount of air from within the enclosed space corresponding to the amount of air introduced and in which the degree of supersaturation of air introduced into the enclosed space measured in the temperature of ° F. to which the air could rise before becoming unsaturated with the amount of moisture contained therein is in excess of the temperature differential between the incoming and the outgoing air.

8. In the method of chilling and refrigerating meat comprising the steps of positioning the meat in a closed space, continuously withdrawing an amount of air from within the closed space, expanding substantially saturated air under ½ to 3 pounds per square inch pressure to the pressure conditions existing within the space while doing work whereby the air is reduced upon expansion to a temperature ½ to 10° below that at which the air would be saturated with the amount of water which remains in the air as vapor under the pressure and temperature conditions existing as distinguished from free water in particle or aerosol form, and introducing the cold and supersaturated air into the refrigerated space.

9. In the method of chilling and refrigerating meat comprising the steps of positioning the meat within a refrigerated space, withdrawing an amount of air continuously from the refrigerated space, introducing air into the refrigerated space corresponding to the amount withdrawn, cooling the air introduced to a temperature within the range of 21–38° F. for maintaining the temperature within the chamber between 32.5–38° F., and subjecting the air prior to introduction while in a substantially saturated state and under pressures to an expansion cycle for reduction in pressure to the conditions existing within the space with consequent cooling of the air whereby the air introduced into the space is supersaturated with water in vapor form in excess of that which the air is normally able to retain under the temperature and pressure conditions existing as distinguished from excess moisture in the air as free water in particle or aerosol form.

References Cited in the file of this patent

UNITED STATES PATENTS

| | | |
|---|---|---|
| 2,065,358 | Zarotschenzeff | Dec. 22, 1936 |
| 2,489,918 | Menges | Nov. 29, 1949 |
| 2,492,308 | Menges | Dec. 27, 1949 |
| 2,494,024 | Williams | Jan. 10, 1950 |